(12) United States Patent
Meyer et al.

(10) Patent No.: US 9,578,123 B2
(45) Date of Patent: Feb. 21, 2017

(54) LIGHT WEIGHT PORTAL PROXY

(75) Inventors: Dominik S. Meyer, Stuttgart (DE); Andreas Seurig, Rottenburg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1842 days.

(21) Appl. No.: 12/350,482

(22) Filed: Jan. 8, 2009

(65) Prior Publication Data
US 2009/0177761 A1   Jul. 9, 2009

(30) Foreign Application Priority Data
Jan. 8, 2008   (EP) .................................. 08100178

(51) Int. Cl.
G06F 15/16 (2006.01)
H04L 29/08 (2006.01)

(52) U.S. Cl.
CPC ....... H04L 67/2819 (2013.01); H04L 67/2842 (2013.01)

(58) Field of Classification Search
USPC ............................................. 709/217; 3/217
See application file for complete search history.

(56) References Cited

U.S. PATENT DOCUMENTS

| | | | |
|---|---|---|---|
| 5,615,341 A | 3/1997 | Agrawal et al. | |
| 6,104,716 A * | 8/2000 | Crichton et al. | 370/401 |
| 6,970,918 B2 * | 11/2005 | Brown et al. | 709/219 |
| 6,985,939 B2 * | 1/2006 | Fletcher et al. | 709/223 |
| 7,133,904 B1 * | 11/2006 | Sohya et al. | 709/218 |
| 7,680,954 B2 * | 3/2010 | Zhang | 709/245 |
| 2001/0051996 A1 * | 12/2001 | Cooper et al. | 709/217 |
| 2003/0167315 A1 * | 9/2003 | Chowdhry et al. | 709/218 |

(Continued)

OTHER PUBLICATIONS

Servlets.com; "com.oreilly.servlet"; Webpage; Oct. 30, 2006; http://www.servlets.com/cos/.

(Continued)

*Primary Examiner* — Hua Fan
(74) *Attorney, Agent, or Firm* — Steven L. Nichols; Fabian Vancott (57) ABSTRACT

A method for accessing locally stored data at a client site via a network request issued by a client browser of a user includes, with a proxy component at the client site, integrating the locally stored data into a placeholder portlet; and providing the portlet including the locally stored data to the client browser in response to the network request. Another method for accessing locally stored data at a client site via a network request issued by a client browser of a user includes providing a placeholder portlet to a proxy component located at the client site; where the placeholder portlet comprises content from an external service provider and is configured to integrate the locally stored data with the content from the external service provider. An electronic data processing system for accessing locally stored data at a client site includes a proxy component configured to intercept requests for access to the locally stored data that are addressed to an external portal server. The proxy component accesses the locally stored data, integrates the locally stored data with content from the external portal server in a placeholder portlet, and serves the placeholder portlet, including the locally stored data, to a requesting client computer.

20 Claims, 6 Drawing Sheets

(56) References Cited

U.S. PATENT DOCUMENTS

2004/0054749 A1\*  3/2004  Doyle et al. .................. 709/217
2005/0010634 A1\*  1/2005  Henderson et al. .......... 709/201
2005/0256940 A1\* 11/2005  Henderson et al. .......... 709/219

OTHER PUBLICATIONS

Masinter, L.; "Returning Values from Forms: Multipart/form-Data"; Aug. 1998; p. 1-9; The Internet Society.
Fielding, R. et al.; "Hypertext Transfer Protocol—HTTP/1.1"; Jun. 1999; p. 1-176; The Internet Society.
Berners-Lee, T. et al.; "Uniform Resource Identifier (URI): Generic Syntax"; Jan. 2005; p. 1-61; The Internet Society.

\* cited by examiner

LIGHT WEIGHT PORTAL PROXY

BACKGROUND OF THE INVENTION

The present specification relates to the field of network computing. In particular, the present specification relates to a method and respective system for accessing locally stored data via a remote service offered by a centrally provided service provider portal.

Many companies operate an intranet portal. This is a web site which aggregates all business applications and information and provides these to the company's employees in a personalized manner. As used herein and in the appended claims, unless otherwise specifically denoted, the term "client" will be used to refer expansively to a device or browser that is able to display the content to the end user. Further, as used herein and in the appended claims, unless otherwise specifically denoted, the term "tenant" will be used to refer expansively to a party who has the right to use such a centralized portal infrastructure hosted by the data center (provider).

Larger companies or associations have centralized data centers that host the infrastructure. However, business areas or cooperation partners also have their own critical business applications and infrastructure that are not centrally hosted because of reasons of autonomy or confidentiality. In contrast, from an IT service and business perspective it is desirable to gain productivity and cost efficiency via a centralized IT and electronically connected business information, e.g. by using a portal integration platform.

Figure 1:
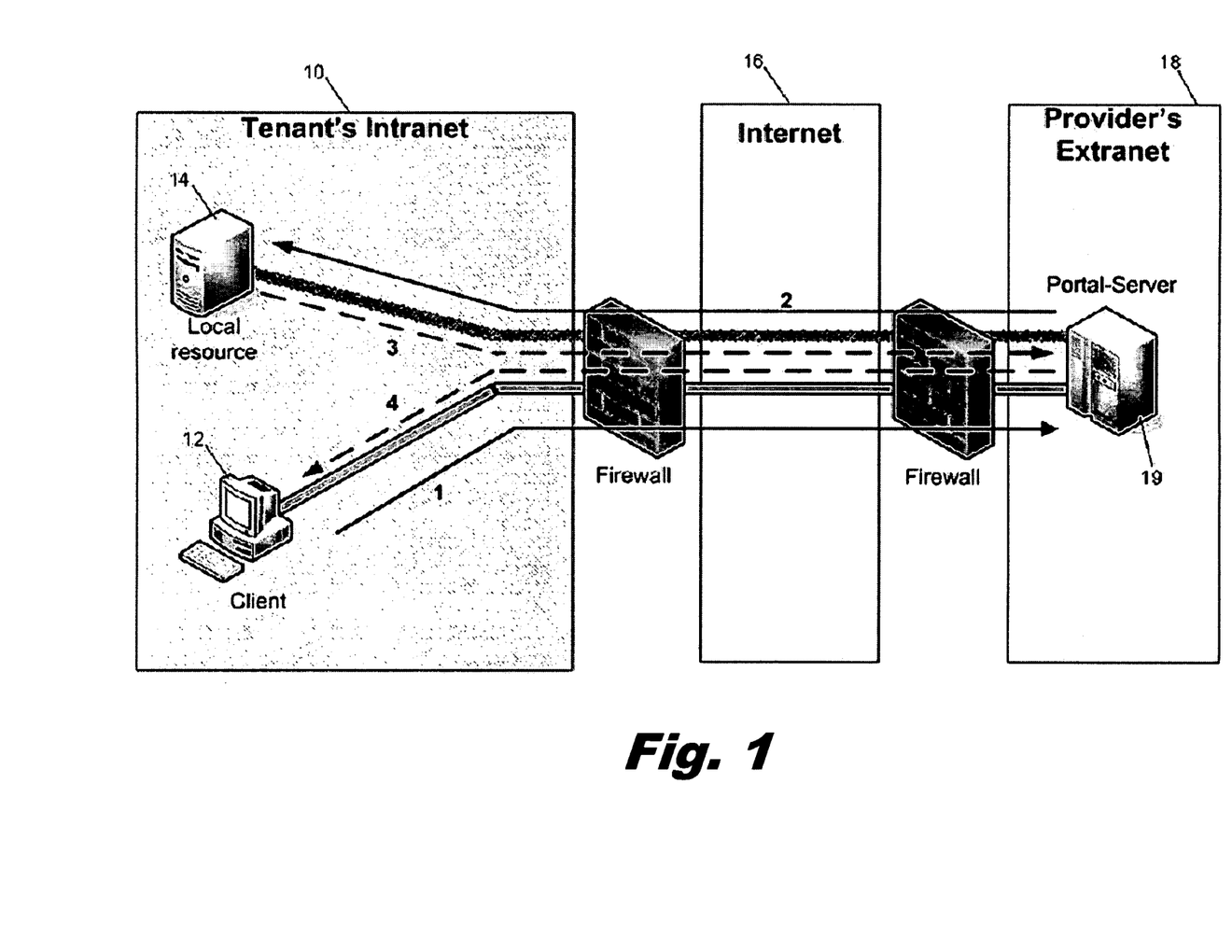
FIG. 1 illustrates the most basic structural components of a prior art hardware and software environment used for a prior art method.

Three state-of-the-art integration variants may be considered: A straightforward approach is depicted in FIG. 1 and is meant to give the provider access to the tenant's intranet, so that he can communicate with the tenant's resources and integrate them into the central portal. The basic idea of such a communication is shown in FIG. 1.

When a client requests content from the portal (step 1), the portal opens a connection to the resources in the client's intranet (step 2) through defined ports in the firewall. The requested pieces of local information are then sent back to the portal through the internet (step 3). This data is integrated into the portal and is sent back as aggregated content to the client (step 4). But within this scenario the provider may be capable of reading sensitive data. And, even if the provider was trustable, all data, including all sensitive pieces of information, would be transferred twice through the internet (see steps 3 and 4). This may require an extensive security effort to protect the data from potential aggressors. Also, this form of back-and-forth-data-transport disadvantageously wastes bandwidth.

To avoid the double transferral of potentially sensitive pieces of information through the internet, all of the tenant's resources could be moved into the provider's site (e.g. extranet) (18). With such a centralization step, the integration of all applications and data can be easily achieved. But this also means that the data may again be visible and accessible to the provider, which is not desirable, especially in the case of sensitive data.

Furthermore, the tenant's autonomy in choosing individual business solutions may be heavily constricted because the installed applications are subject to the provider's restrictions, whereas the tenant has the power to decide what content is on his own intranet site. In addition to this, the hosting-costs have to be considered carefully.

Another option would be client-side content integration via state-of-the-art techniques like IFrames or AJAX (Asynchronous JavaScript and XML). IFrame is an HTML element which can embed another HTML document inside the main document. The drawback of this solution is that the portal content cannot communicate with this IFrame using standardized portlet to portlet communication mechanisms, and the content of the IFrame is not in the portal context. AJAX is a popular way of exchanging data with application services in order to make web pages feel more responsive. To enable AJAX calls to the portal and to local services the portal and local tenant's services have to be in the same (virtual) domain to circumvent the origin policy of the browser's sandbox security. This again makes the tenant's environment vulnerable because central portlets are also able to access the local tenant's (AJAX) services.

Besides the need of IT to centralize infrastructure and services, many tenants also need to use their own individual infrastructure, which may include confidential workflows and confidential data. Both, intellectual property and pure business data should not be revealed to the provider. In this regard, the above prior art portal cannot fulfill its role as the single point of access to all business applications. Hence, the confidentiality needs of the multiple client companies are not satisfied.

BRIEF SUMMARY OF THE INVENTION

According to one embodiment of the present invention, a method for accessing data locally stored at a client site via a network request issued by a client browser of a user, is disclosed, comprising providing a proxy component, wherein the proxy component is communicatively coupled to a network portal server located remote from the client site, evaluating, via the proxy component, the network request and forwarding the network request to the portal server, receiving, by the proxy component, a place holder portlet for servicing the remote service and including control information for controlling the proxy component for accessing the locally stored data in response to the evaluation of the network request, evaluating, via the proxy component, the control information to identify a particular remote service dedicated to access the locally stored data, requesting and receiving, via the proxy component, the locally stored data, and inserting the locally stored data into the placeholder portlet for being displayed at the client browser of the user.

According to another embodiment of the present invention, a method for accessing locally stored data via a network request directed to a centrally provided network portal, is disclosed, comprising providing a server communicatively coupled to a proxy component, receiving a request from the proxy component for accessing the locally stored data, selecting a particular remote service from a predefined list of a number of remote services which fulfill the request, and sending to the proxy component a place holder portlet including control information configured to control the proxy component to identify the selected particular remote service.

According to yet another embodiment of the present invention, an electronic data processing system for accessing data locally stored at a client site, is disclosed, comprising a client device configured to display the locally stored data to a user via a client browser; a server configured to store the locally stored data, and a proxy component communicatively coupled to the client device and the server, the proxy component configured to evaluate a network request from the client browser and forward the network request to a portal server; receive, in response to the evaluation of the network request, a place holder portlet for servicing a number of remote services, identify within the control information a particular remote service dedicated to accessing the locally stored data, requesting and receiving the locally stored data, and inserting the data into the placeholder portlet for display at the client browser of the client device, wherein the place holder portlet comprises control information for controlling the proxy component for accessing the locally stored data.

According to yet another embodiment of the present invention, a computer program product for accessing data locally stored at a client site via a network request issued by a client browser of a user and using portal infrastructure of a network portal server located remote from the client site, and maintaining a hardware and software infrastructure for the management of the end-user requests via remote services, is disclosed, comprising a computer useable medium having computer usable program code embodied therewith, the computer usable program code comprising computer usable program code configured to evaluate the request and forward the request to the portal server, computer usable program code configured to receive, in response to the evaluation of the request, a place holder portlet for servicing the remote service and including control information for controlling the proxy component for accessing the stored data, computer usable program code configured to evaluate the control information to identify a particular remote service dedicated to accessing the locally stored data, computer usable program code configured to request and receive the locally stored data, and computer usable program code configured to insert the data into the placeholder portlet for being displayed at the client browser of the user.

BRIEF DESCRIPTION OF THE SEVERAL VIEWS OF THE DRAWINGS

The present invention is illustrated by way of example and is not limited by the shape of the figures of the drawings in which.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To address the issues described above, the present specification describes the design and an exemplary implementation of a so-called "light-weight" portal proxy, ready to be installed at a tenant's intranet. The light weight portal proxy is able to integrate the local resources' data into the central portal's content by using a so-called "place-holder-portlet" which is stored and managed at the portal server, transferred to the tenant, and "filled" with local content at the tenant's intranet. The local resources' data can then be displayed to the end user. Therefore, the present invention provides a method for allowing central management of a portal accessible for many clients, in which, however, data confidentiality is preserved for each of the clients.

In order to enable a centrally hosted portal to integrate protected local tenant content and applications, a proxy at the tenant's side is implemented. This "light weight proxy" is characterized by the following steps:

a) forwarding arriving requests that are targeted to the portal, b) evaluating a respective request and response data stream to identify placeholder portlets that include information requesting local tenant applications and data sources, c) passing requested actions and parameters to the corresponding service and receiving the result for further processing, d) inserting DHTML compliant content retrieved from the data or application service into the placeholder portlet's marked position within the data stream for being displayed at the browser of the user.

In an exemplary embodiment of this method, the task of content-retrieval and communication towards the local resources is done by so called ServiceConnectors, which are highly extensible components of the proxy-framework. The administration effort of this proxy is reduced to a minimum. Therefore, except for the installation of the proxy and configuration of the ServiceConnectors, no further administration is required. This proxy administration can be reduced by using technologies like Open Services Gateway initiative (OSGi) for a centralized remote service management.

This method further includes steps for handling inter-portlet communication. Inter-portlet communication is a central feature of enterprise portals. Hence, the inventory proxy supports this feature as well. Two facets are considered here; the communication between a placeholder-portlet and a central portlet, and the communication between two placeholder-portlets. Within the first scenario, the placeholder portlet may be in the role of the communication source or in the role of the communication target.

The communication between two central portlets is handled by the portal itself and does not need not to be regarded by the proxy.

Portlet-to-Portlet Communication Between Placeholder-Portlet and Central Portlet Placeholder Portlet as Communication Target In the role of a communication target, the placeholder portlet may be informed of updates of the communication's source portlet. In the first step, all portlets, including the placeholder-portlet, may register their shared properties with the portal. Since the placeholder-portlet may represent different local resources, it has to register the properties according to the currently integrated resource. Therefore, the placeholder-portlet might keep a Web Services Description Language file (WSDL-file) for each local resource which provides inter-portlet communication. This WSDL-file describes all input- and output-parameters for the corresponding local resource.

After the properties have been registered, the portal renders the portlets so that the proxy can retrieve their markup and, in the case of the placeholder-portlet, connect the corresponding local resource. In contrast to the other integration scenarios, the proxy is now told that its integrated resource is used as the target in an inter-portlet communication. So, the placeholder-portlet is rendered with additional information and could accordingly look as shown in the following listing:

```
<localService portletId="PID1">
    <user>cG9ydGFsVXNlcg==</user>
    <password>cGFzc3dvcmQ=</password>
    <serviceId>23</serviceId>
    <wires>
    <wire>
    <action>
        <name>actionName</name>
    </action>
    <input>
        <ns>http://namespace</ns>
        <type>String</type>
    </input>
    </wire>
    </wires>
</localService>
```

Besides the information which was also passed in earlier scenarios, an additional element called "wires" is now included, which contains information on how the placeholder is involved in inter-portlet-communication. Each child of this additional element describes a wire, which is the connection between two portlets. This wire is defined by a unique action and the WSDL type of input-data that is offered to the placeholder-portlet. The corresponding ServiceConnector which is responsible for integrating the selected resource must now prepare its logic for handling this type of input.

The user now performs an action towards the central source-portlet. Since the portal is aware of the placeholder-portlet being a communication target, it updates the corresponding input-values at the placeholder portlet. Next, the portlets are rendered again. This time, the placeholder portlet must carry the retrieved input-values in its markup in order to inform the proxy about the new values. The markup according to the previously introduced example is shown exemplarily in the following listing:

```
<localService portletId="PID1">
    <user>cG9ydGFsVXNlcg==</user>
    <password>cGFzc3dvcmQ=</password>
    <serviceId>23</serviceId>
    <wires>
        <wire>
        <action>
            <name>actionName</name>
        </action>
        <input>
            <ns>http://namespace</ns>
            <value>ParameterValue</value>
        </input>
        </wire>
    </wires>
</localService>
```

This time, the wire contains a concrete value for the action. The placeholder-portlet's markup is again passed to the proxy.

After the proxy has received the updated value, the responsible ServiceConnector performs the corresponding action towards the local resource, regarding the new values. The resource's information is then read again and inserted in the placeholder-portlet's markup.

Placeholder-Portlet as Communication Source

In this scenario, the placeholder-portlet acts as the communication source and provides a property to another portlet. The first step in this scenario is equal to the first step in the first case above, where the placeholder-portlet acts as communication target; the portlets register themselves towards the portal. In contrast to the first scenario, the placeholder portlet acts this time as the communication's source. Hence, it provides a different markup which is shown exemplarily in the following listing:

```
<localService portletId="PID1">
    <user>cG9ydGFsVXNlcg==</user>
    <password>cGFzc3dvcmQ=</password>
    <serviceId>23</serviceId>
    <wires>
        <wire>
        <action>
            <name>actionName</name>
            <url>http://proxy.com/oWklsI#dje</url>
        </action>
        <output>
            <type>String</type>
            <ns>http://namespace</ns>
        </output>
        </wire>
    </wires>
</localService>
```

The action-element now contains a URL to which the updated properties must be sent. Also, instead of an input-element, an output-element is transferred to inform the ServiceConnector, that its resource is used as communication-source.

Next, the user performs an action towards the placeholder-portlet which is captured by the proxy. The proxy processes this action at the corresponding local resource and retrieves the updated information. Then, since the proxy knows from the previously rendered placeholder markup that this resource is used as source in an inter-portlet communication, it sends the updated values to the portal using the submitted action-URL. Finally, the portlets are rendered again and are finally transferred to the proxy.

Portlet-to-Portlet Communication Between Placeholder-Portlets

If inter-portlet communication is to take place between two placeholder-portlets, the same mechanisms as described above may be used. In this case, one placeholder-portlet acts as communication target and the other placeholder-portlet acts as communication source.

Figure 2:
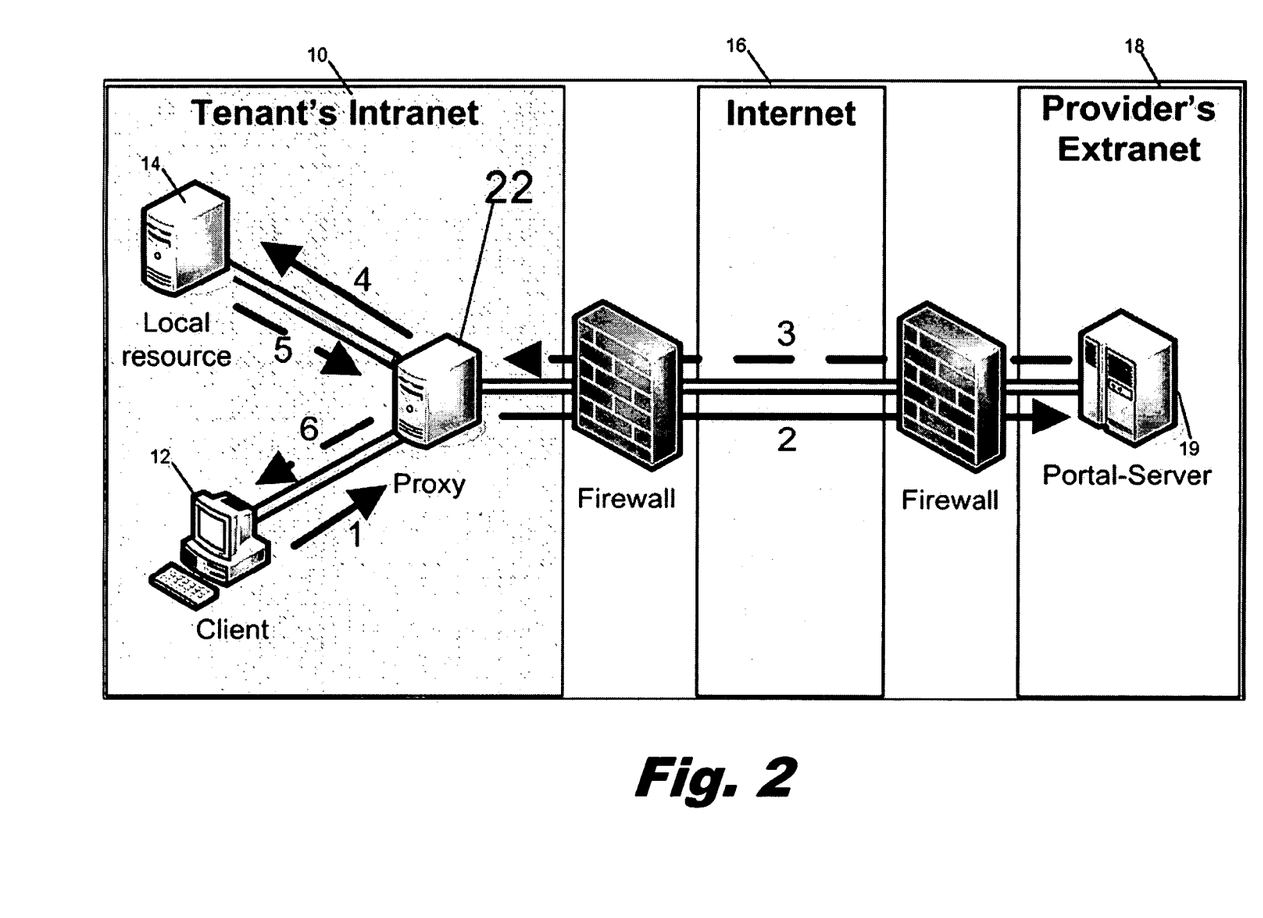
FIG. 2 illustrates the most basic structural components of a hardware and software environment used for an embodiment of the method including a proxy component which performs a significant part of the method.

With general reference to the figures and with special reference now to FIG. 2 a solution is the implementation of a "lightweight" portal proxy component (22), i.e., an intermediately switched computer with dedicated functional "proxy" components, such as receive, process and send data packets, also referred to herein simply as "proxy", in the tenant's, (i.e., client's) intranet (10). This proxy (22) captures the provided portal data-stream and injects the desired local resource-data at a point pre-defined by the central portal. To avoid additional costs and effort, the proxy (22) is able to run almost without any further administration. The only task which is done for administration on the tenant's side is the initial installation and the configuration of local resources. Portal-, respectively content-related tasks are carried out at the central portal (19) only.

According to FIG. 2, each partial system that is involved in the integration-scenario is represented as a single component. The client (12) uses the portal server (19) and the local resources (14) via the communication sections depicted as arrows "1" to "6." The portal (19) provides the portal-content and defines the integration-point for local content at arrows 2 and 3. The local resources (14) provide the content to be integrated into portlets provided by the portal (19) at arrows 4 and 5, and the proxy (22) intercepts the portal-data-stream after arrows 1 and 3 and integrates the content after arrows 4 and 5 such that the user does not recognize that this content comes from "his own" local resources (14). To follow, some details are described which are relevant for an implementation of this embodiment:

URL Rewriting

HTML uses hypertext references, herein referred to as "links," to reference to different pages. These links can either consist of absolute or relative paths.

Relative paths describe the position of the referenced page at the host in relation to the current document (e.g. <a href=" . . . / . . . /someDocument.html"/>) whereas absolute paths point to an absolute position of the referenced document (e.g. <a href=http://localhost/someDocument.html/>). (See [RFC 3986]). In the case wherein the portal provides documents which contain absolute paths, the proxy needs to re-write these references in order to keep the client in the proxy's context. Otherwise, the client would connect directly to the portal server when clicking a link which uses an absolute reference, and, therefore, the proxy would not be excluded from the communication and hence would not be able to manipulate the client-portal communication. Re-writing means that the proxy replaces the portal's host name by its own when sending data to the user and re-routes requests following this new link to the right documents at the portal.

As may be determined, searching for absolute references in every document which is sent by the portal may cause a notable performance impact. Knowing that not all objects can contain references (e.g. images, binary data, etc.), a differentiation of the passed objects is performed (see "Binary Content and Markup Content" below).

Another possibility to keep the client in the proxy's context would be an intervention at the tenant's network-logic: The Domain Name Service (DNS) server may be instructed to redirect all requests, which are targeted at the portal, to the proxy (22). Hence, no URL-rewriting is needed. Therefore, the intervention at the tenant's DNS server helps to provide a reliable and performance-effective method step. The sample proxy, which was developed as proof of concept for this invention (further referred to as "POC"), uses a URL-rewriting technique.

Request Methods

The HTTP [RFC 2616] defines eight different types of request-methods which might all be used in a client-server communication. Two of them, the GET and the POST method, were implemented in the POC. Nevertheless, the proxy described within this invention must cover all eight request types. The proxy must pose requests towards the portal in the same manner in which it received the requests from the client. That means, that if a GET-request is targeted at the proxy, it must request the portal's content also using a GET request, etc.

GET is the most common method to be used in HTTP-communication. It simply retrieves information from a specific URI without side effects on the server, which means that the server's state is not affected. The POST-method is used to transfer user-data (e.g. from a HTML-form) to the server (e.g. portal-server). Unlike the GET-method, it can also be used to transfer large amounts of data (e.g. files). The information is consequently not included in the request-URI, but in the HTTP-message.

Multipart Messages

Multipart Messages (e.g. messages described in RFC 2388) must also be supported by the proxy. To enable the POC implementation for these kinds of requests, additional software must be used since the multipart-messages are not natively supported by Servlets. This support of multi-part-messages can, for example, be added by installing the "O'Reilly servlet package," commercially available under com.oreilly.servlet, or similar.

Binary Content and Markup Content

As already mentioned, a portal can deliver different types of content to its users (e.g. markup documents, images, different types of flat files like .doc-documents, etc.). For the proxy's purpose, a differentiation into two types of content may be performed: binary content and markup content. Markup content comprises all types of portal-content which may possibly need any intervention by the proxy, e.g. the rewriting of references (see above regarding "URL-Rewriting") or replacement of the placeholder-portlet. For reasons of simplicity, all types of content which might need to be manipulated are included in the term "markup content" although these may be JavaScript-files (*.js) or other content, which contain no markup at all. All types of content which need no further investigation or intervention by the proxy (22) are referred to as "binary content," since these are mainly binary documents like images, flat files, etc. To differentiate these two content-types, they are handled by the proxy (22) as objects of the type MarkupContent or BinaryContent respectively, which both extend the abstract base-class Content. This differentiation leads also to performance and execution optimizations.

Binary Content

Binary content can be read using binary stream readers. Since no manipulation (e.g. URL re-writing) is done at this data, it does not have to be examined, and, therefore, it does not need to be converted to text.

Markup Content

Markup content can be read using text (stream) readers. These readers automatically convert the read data to textual content, which can then be checked for needed intervention.

Markup-Insertion

To integrate the local resources' data into the portal-content, the markup-fragments of the local resources must be inserted into the portal's markup, replacing the above-mentioned place-holder-portlet provided by the portal. If a portal-page which is requested by the client contains one or more placeholder-portlets, the proxy stores a copy of this page's markup. Then, the local resources which are referenced in the place-holder-portlets are connected, and their returned information is inserted as markup in place of the corresponding placeholder-portlets' markup. The local resources' markup is also stored by the proxy (22).

If the user performs an action towards one of these placeholder-portlets, the corresponding resource is connected and its stored markup is replaced by the newly extracted markup. Then, each placeholder-portlet in the previously stored portal-page is replaced by the stored local services' markup, including the updated resource's markup, before the page-content is sent back to the client. Hence, the portal (19) does not need to be connected again if an action towards a local resource is processed.

Another possibility of markup-insertion is to temporarily store the portal-page in which the placeholder-portlets have already been replaced. If an action towards a local resource was processed, only the corresponding markup will have to be replaced in the page instead of inserting all resource markups each time. But if the page did not contain the placeholder-portlet's markup, the proxy could not identify the point of integration. Therefore, a new kind of anchor will have to be inserted which surrounds each local service's markup in order to uniquely identify it. This can, for example, be a HTML-comment which contains the placeholder portlet's ID.

However, since the ServiceConnectors are responsible for creating the markup of a local resource, they will also have to insert this comment. This poses no problem for already implemented ServiceConnectors, but should be envisaged particularly if a tenant implements its own ServiceConnectors and misses this comment. Therefore, the implemented solution is the most secure for this issue since the whole integration process is matter of the core implementation, whereas the proxy's extensible parts are not involved.

Preferably, the content of two resources has previously been inserted into a portal page and stored by the proxy. Now, the user may perform an action towards the second resource. After this resource's content has been updated both placeholder-portlets are replaced by the corresponding markup. Next, the system architecture and functionality of an implementation of the "Light weight Proxy" component (22) will be described in more detail and with reference to FIGS. 3 and 4.

Proxy Components

Figure 3:
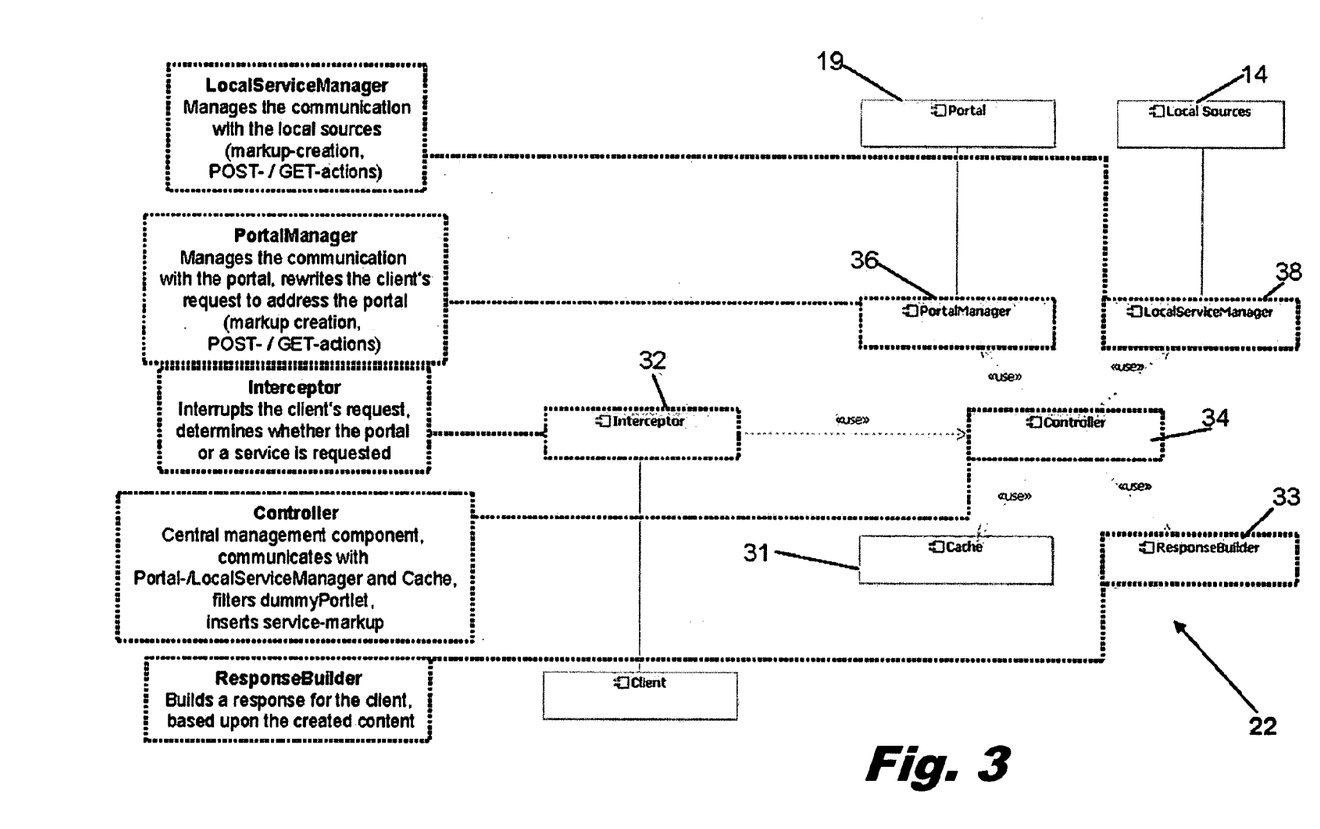
FIGS. 3 and 4 illustrate essential components and respective basic functionalities of an implementation of the method as far as implemented in the client side proxy component.
Figure 4:
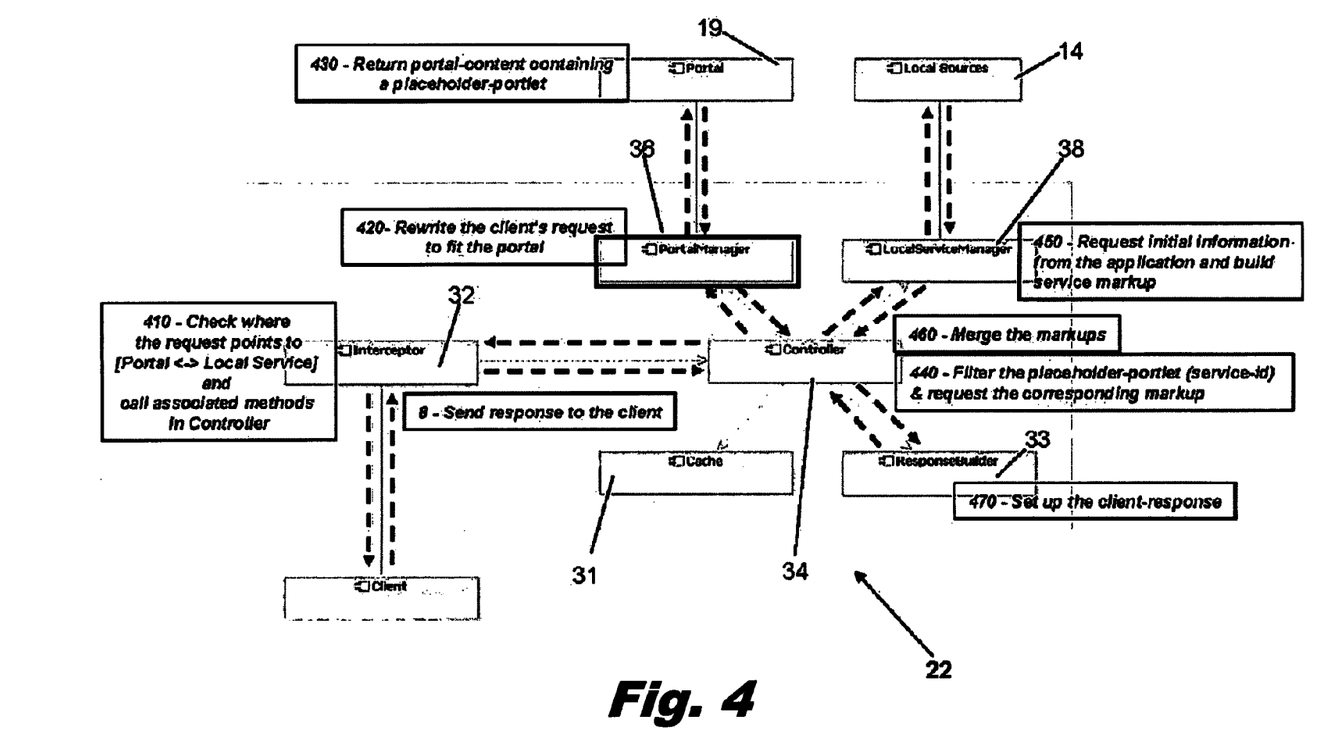

The proxy component (22) may comprise six (sub)components, the implemented functionalities of which will be described next below:

An interceptor (32), as the name implies, intercepts the client's request and determines whether the request is directed towards the portal (19) or towards the integrated local resources (14) (step 410). A controller (34) is the proxy's (22) central management component. The controller provides methods for communication with the local resources (14), the portal (19), and a cache storage (31). Furthermore, the controller filters the placeholder-portlet from the portal-data-stream and substitutes it with the local resources' markup.

Communication towards the portal (19) is handled by a PortalManager component (36). The PortalManager opens a connection towards the portal (19) based upon the client's request, which arrived at the proxy (22), and reads the portals response.

A LocalServiceManager component (38) is, in analogue to the PortalManager, responsible for the communication towards the local services. The LocalServiceManager builds the requests and generates the markup fragment to be inserted into the placeholder-portlet. This local content will not be sent to the portal, but only to the client, except in the case of portlet-to-portlet-communication.

The performance-loss which is caused by inserting the proxy (22) in the communication should advantageously be minimized. One main contributor to meet the requirement is a Cache component (31), which temporarily stores the content processed by the proxy (22). When the same content-object is requested again, the proxy can directly return it from the Cache (31) without the need of reading it again. A ResponseBuilder (33) creates a response for the client which is based upon the read content without regard to whether a local resource has been integrated or not.

The basic steps of the control flow of the method will now be described with reference to FIG. 4. An end user uses the browser to connect to the portal. This request is actually targeted to the lightweight proxy (22) at the tenant site. The proxy then again sends (step 420) the request to the provider's portal by calling respective methods in the controller component (34) (step 410). This interception enables the proxy to examine and manipulate the incoming and outgoing data stream from and to the provider's portal for local service requests within in the tenant's zone.

After the initial request, the portal response (step 430) may contain one or more service requests to local tenant's applications in order to provide content to the portal response. Such local service requests are defined in so-called placeholder portlets describing mainly the local service with a respective service ID and request parameters. The light weight proxy (22) scans (in this case) the portal response data stream for such placeholder portlets and identifies the corresponding local service (step 440).

The proxy (22) extracts the service action and parameter and passes it to that service (step 450). The service may access the backend application by, for example, executing a database query and forming a DHTML compliant response, and may substitute the placeholder portlet content by merging the respective markups (step 460).

After processing all local service tasks, the manipulated portal data response is set up (step 470), and is sent to the client. For the end user it appears that all content on his portal page comes from the portal. It is transparent to the user where the information actually came from.

As mentioned above, this interception and manipulation of the data stream works also in the opposite way. When a user submits a form within the placeholder portlet, this request may be handled by the proxy (22) exclusively without sending the data stream to the central portal server. However, there may be a need to communicate with other central portlets (portlet to portlet communication) wherein the data exchange has to be handled by the portal itself.

Figure 5:
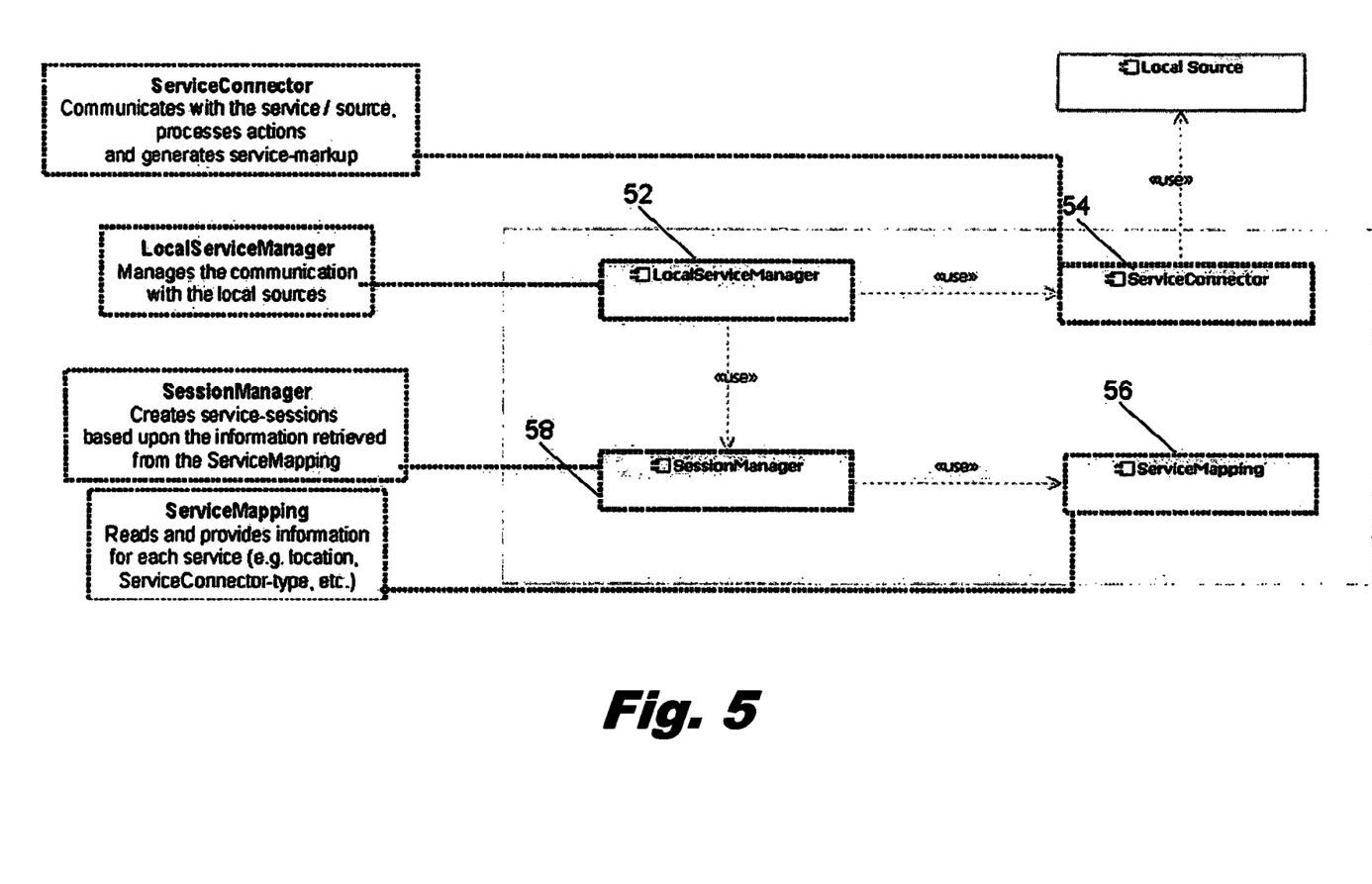
FIGS. 5 and 6 illustrate essential components and respective basic functionalities of an implementation of the method including the concept of "Service connectors," as far as implemented in the client side proxy component.
Figure 6:
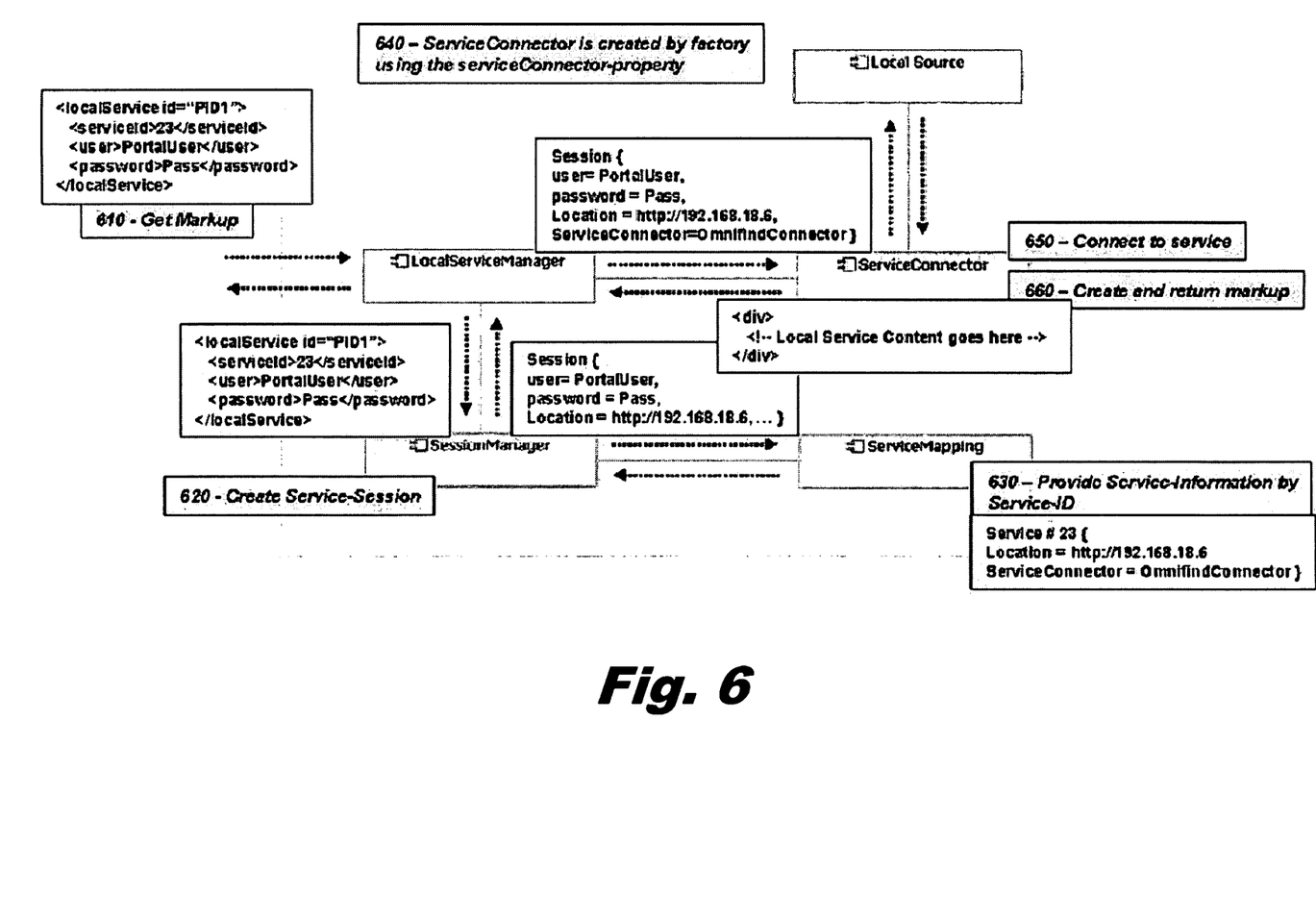

With respect to FIGS. 5 and 6, illustrating essential components and respective basic functionalities of an implementation of the method including the concept of "Service connectors," as far as implemented in the client side proxy component, on a more fine-grained level, the LocalService-Manager (52) may be divided into four sub-components. The LocalServiceManager (52), itself, may act as a mediator between the controller (FIGS. 3, 34) and the sub components. A ServiceConnector (54) may be responsible for connecting to the local sources. The ServiceMapping component (56), may read and provide information for each service (e.g. location, ServiceConnector-type, etc.). Finally, the SessionManager (58) may create service-sessions based upon the information retrieved from the ServiceMapping component (56).

With additional reference to FIG. 6, when a new request arrives at the LocalServiceManager (52) (step 610), it may instruct the SessionManager (58) to create a new session based upon the information provided in the passed placeholder portlet (step 620). The SessionManager (58) may then connect to the ServiceMapping component (56) in order to get the proxy's local information needed to connect to the desired service. This may be done based on a unique service ID. The ServiceMapping component (56) may extract this information from the proxy's local service information storage which may, for example, be a database. In another example, this information may be stored in a simple XML file, which then may be read by the Service-Mapping component (56) (step 630).

The extracted information, and, in particular, the location of the service and the ServiceConnector (54), which may be created at (step 640) using the "ServiceConnector" property and which may be used, may then be stored in the created session which is accessed in each further communication of this client with the corresponding service.

After passing this session to the LocalServiceManager (52), the LocalServiceManager (52) may call the nominated ServiceConnector (54) and give the created session to the ServiceConnector (54) so that it can use the session's information to connect to the corresponding service and then extract the information (step 650). Then, at (step 660), the information of the local source may be converted to markup. This local service's markup and the portal's markup may then be merged. More precisely, the local content's markup may be inserted into the placeholder-portlet. Finally, the merged markup may be returned to the client.

Further details regarding the implementation of the before-mentioned elements used in the embodiments above will now be described. With reference to the "placeholder-portlet," this portlet is used by the central portal in order to define the point of integration where the local resource's content is to be inserted. Furthermore, it acts as a mediator between proxy (22) and portal (19). Portal (FIGS. 2, 19) and proxy (FIGS. 2, 22) have well defined tasks. When information needs to be sent from the portal (FIGS. 2, 19) to the proxy (FIGS. 2, 22), this may always be channeled through the placeholder portlet. In the initial request, the placeholder portlet may provide the local resource's information in the portlet-body. This information may include the portlet's ID automatically created by the portal, the unique ID of the local resource to be integrated, and the user credentials stored at the portal-side.

According to the open-/close-principle, further extension of this portlet is advantageous due to the dynamic attribute pattern used in the LocalServiceManager component (38) of the proxy (22). This means, in particular, that additional information may be transferred from the portal (FIGS. 2, 19) to the proxy (FIGS. 2, 22) through the placeholder-portlet. This may, for example, be used to transfer the portal's navigational state to the portlet. The proxy (22) may replace the portlet's content by the markup extracted from the local resource, whereas the surrounding decorations and the portlet-controls are not manipulated by the proxy (22).

Placeholder Portlet Sample

Next, an implementation and usage of the placeholder portlet will now be further described. A sample of a placeholder markup can be seen in the following listing:

```
<localService portletId="PID1">
    <serviceId>23</serviceId>
    <user>cG9ydGFsVXNlcg==</user>
    <password>cGFzc3dvcmQ=</password>
</localService>
```

The root-element of the placeholder portlet's content is called "localService." Its attribute "portletId" contains the portlet's unique ID which is created by the portal. The child elements of this root-element may contain any information which may be transferred to the proxy. These elements are stored by the proxy in the corresponding Session-object, whereat the element's name is used as key in a session's HashMap and can be retrieved from the session by calling its method "getProperty" with the corresponding key. In the case of the example above, three pieces of information may be transferred: the service-id, the username, and the user's password. The service-id (serviceId) defines the service to be integrated at the portlet's point.

The user's credentials may also be stored in the placeholder portlet. These are not the credentials the user logs on to the portal with, but the credentials needed to authenticate towards the local resource. Since this data is transferred through the internet, the credentials are not stored in plaintext, but are encrypted to ensure a secure transfer. For the purpose of this invention, a secure algorithm is preferred.

Portal-Sided Information

To achieve a single point of administration, the administration of the local resources may advantageously be done at the portal side using the placeholder-portlet. Therefore, information on the local resources is needed at the portal's side. There is no restriction on how this information is stored (e.g. in a database, flat file, etc.). In one embodiment, however, this information may be stored in a XML-file (local_service_description_portal.xml) which is defined by an Extensible Schema Definition (XSD) called local-service-desc-portal.xsd.

The portal-administrator should be able to select the local resource to be integrated in the portlet's configuration mode. Hence, the information which is accessible to the portlet must include the unique ID, the name, and a description of all available local resources. Of course, the ID must be the same as on the proxy's side. A sample of such a XML-file can be seen in the listing below:

```
<?xml version="1.0" encoding="ISO-8859-1" ?>
<localServices xmlns:xsi=http://www.w3.org/2001/XMLSchema-instance
xsi:noNamespaceSchemaLocation="local-service-desc-portal.xsd">
<service>
<ID>-1</ID>
<title>No Service</title>
<description>Default Integrator - displays no service.</description>
</service>
<service>
<ID>1</ID>
<title>Flat-File Integration</title>
<description>The textfile producerFile.txt on the proxy's
filesystem.</description>
</service>
<service>
<ID>2</ID>
<title>TamNoon Integration</title>
<description>IBM's desktop search-engine.</description>
</service>
</localServices>
```

Every provided service may be defined by a service-element, which includes the resource's id (<ID>), its title (<title>) and its description (<description>). The first service defined in this special case is mandatory and represents the default-service with the id "−1." When this service is selected, the proxy uses its default ServiceConnector (FIGS. 5, 54) (called DefaultConnector), which integrates no local resource.

Proxy-Sided Service Information

Besides the above-mentioned portal-sided information about the local services, there may also be some information which needs to be available to the proxy. As on the portal's side it does not matter how this information is stored for the proxy (database, etc.). However, for the sample implementation it is again stored in an XML file, herein referred to as service description file.

Sample ServiceConnectors

To prove the functionality of this disclosure, two exemplary ServiceConnectors (FIGS. 5, 54) have been implemented which demonstrate the integration of local resources, and, furthermore, show the best practices for implementing ServiceConnectors (FIGS. 5, 54). To demonstrate the basic functionality of integrating local resources into the portal content, a flat file manipulation service has been implemented. A text file's content may be displayed in the portal. In order to demonstrate actions towards local resources, the portal-user may be able to append some text to this file. This also demonstrates that local sources can be integrated that are not web-based. For this purpose, a ServiceConnector (FIGS. 5, 54) has been implemented and service-descriptions were created at the portal's side, and on the proxy's side.

To register the sample flat file integration at the proxy, its description has been added to the service description file local_service_description_proxy.xml in the applications' WEB-INF directory. The fragment added to this description can be seen in the listing below:

```
<service>
<ID>1</ID>
<location>C:\\\\proxy\\producerFile.txt</location>
<serviceConnector>serviceConnectors.FileConnector</serviceConnector>
</service>
```

Three properties are set in this description. The first property may be the unique ID of this integration, which must be equal to the ID set at the portal's configuration; in this case "1." The second property may be the location property which defines the local path of the text file in the proxy's file system. The third property may be the serviceConnector-element which indicates which ServiceConnector is used to integrate the file. In this case, this is the FileConnector in the package serviceConnectors.

Portal Service Description

To enable the service to be selected at the central portal, the service is also registered at the portal. Therefore, its description may be added to the portal's service description file local_service_description_portal.xml. Within this description, three properties may be set. The first property may be that the ID-element represents the resource's unique id. This must be the same id as already used in the proxy's service description.

The second property may be that the title-element keeps the title of the flat file integration. It is used in the placeholder portlet's configure mode to show all available local resources to the portal administrator. The third property may be that the description element contains a short description of the integration, and is displayed as the title to the portal-administrator in the portlet's configure mode.

Special pieces of local information like the location of the text file are not visible to the portal. Within this section, only the relevant code-fragments are listed. Like the ServiceConnectors (FIGS. 5, 54), the FileConnector (which is implemented for this integration) implements the abstract base class ServiceConnector and therefore provides the already known set of methods.

getMarkup(HttpServletRequest)

This is the initial request-method which simply retrieves the initial information from the file and returns it in the form of a MarkupContent object. Its parameter requires no further attention, since it will not be used within this method for the FileConnector's purpose. First, a new String object is created which is thought to store the markup to be returned. Before any content from the text file is appended, an opening div-tag is written to this string. This div-element contains css-definitions, which enables the text file's content to be formatted. Then, the location of the text-file is extracted from the Session-object stored in the ServiceConnector. Then, a FileReader (java.io.FileReader) is created which opens the text file at the specified location. By way of example, the listing for markup generation may as follows:

```
// The String containing the markup to be returned
String readContent = new String( );
// Appending an opening div-tag
readContent += "\n\n<div style=\"background-color: #D9D9F3;"+
"width: 200pt; font-family:arial,helvetica;"+
"font-size:12pt;\">\n";
// Extracting the file's location from the session
String location = this.session.getProperty("location");
// Setting up a FileReader (BufferedReader)
BufferedReader br = new BufferedReader(new FileReader(location));
```

After this set up, the text file is read and appended to the String. To enable actions towards the text file, a HTML-form containing an input-text-field is created and written to this String.

This form includes a hidden field called "placeholder_portlet_id" which contains the ID of the placeholder-portlet (see the listing below) in order to identify the correct portlet when an action is processed. The portlet's ID is stored in the session as the session's id. The action of the form must not point to any position but the same page, which is done by entering a hash mark (#). Finally, the previously opened div-tag is closed and a MarkupContent object is created based upon the markup-string, which is then returned.

```
readContent +=
"<form method=\"POST\" action=\"#\">"+
"<input type=\"text\" size=\"20\" name=\"stringToAdd\" />" +
"<input type=\"submit\" value=\"SEND\" />" +
"<input type=\"hidden\" name=\"placeholder_portlet_id\" "+
" value=\""+this.session.getSessionId( )+"\" />" +
"</form>";
readContent += "</div>\n";
```

Besides the creation of the markup, the file's original content is stored in the instance String nativeContent. The reason for this will be clarified in the description of the doPost-method below.

doGet(HttpServletRequest)

This mandatory method is called by the LocalServiceManager (38), when a GET-action towards the according placeholder-portlet is processed. Since in this case, only POST-requests will be used, this method only calls the ServiceConnector's doPost-method.

doPost(HttpServletRequest):

This method is called when the previously created HTML-form is submitted. As mentioned above, a text entered by the user shall be appended to the file. Therefore, the file's original content is read from the instance variable, to which it has been stored in the getMarkup-method. The text, which is appended, may be retrieved from the passed HttpServletRequest object using its getParameter(String)-method. After the entered text has been appended, the content is written back to the file using a FileWriter (java.io.FileWriter). Finally, the markup is extracted again by calling the connector's getMarkup-method and is then returned.

```
// read the previously stored file-content
String toBeWrittenBack = new String(this.nativeContent);
// read the text to be appended from the HttpServletRequest
String toBeAdded = req.getParameter("stringToAdd");
// append the string
toBeWrittenBack += "\n"+toBeAdded;
```

Proxy-Server Setup will now be described in more detail. For the purpose of functional demonstration, the proxy server application is installed at a prior art Tomcat-server in version 5.5.17, but it could also be installed on any other J2EE-based application server. Tomcat is a prior art light weight Java-based HTTP-server provided by the Apache-Group. Below, the configuration of the Tomcat server is described, which is needed to be used for the proxy's purposes.

Connectors and Ports

The proxy (22) provides two ports to the clients; an HTTP-port, and an HTTPS-port. Hence, these ports have to be opened in the proxy's underlying Tomcat-server. For reasons of simplicity, the same ports shall be used for the proxy, which are also used at the central portal's side. As in the case of HTTP, the standard-port (e.g. port 443) for this protocol will be opened at the proxy. Tomcat provides a XML-file, "server.xml," in which the server's configuration, including the ports, is done. By default, the HTTP-port is set to 8080 in this file, whereas a HTTPS-port is not defined. The port definitions in Tomcat's configuration file are done by so-called "connectors." Hence, the default HTTP connector is changed to fit the proxy's needs and a second connector is created to enable HTTPS-connections. These connectors are shown in the listing below:

```
<Connector port="80" maxHttpHeaderSize="8192" maxThreads="150"
minSpareThreads="25" maxSpareThreads="75" enableLookups="false"
acceptCount="100" connectionTimeout="20000"
disableUploadTimeout="true"
compression="on" compressionMinSize="2048"
noCompressionUserAgents="gozilla,
traviata" compressableMimeType="text/html,text/xml" />
<Connector port="443" maxHttpHeaderSize="8192" maxThreads="150"
minSpareThreads="25" maxSpareThreads="75" enableLookups="false"
disableUploadTimeout="true" acceptCount="100" scheme="https"
secure="true"
clientAuth="false" sslProtocol="TLS" compression="on"
compressionMinSize="2048" noCompressionUserAgents="gozilla,
traviata"
compressableMimeType="text/html,text/xml" />
```

The relevant settings which differ from Tomcat's default will now be described. The first connector sets the standard HTTP-port to port 80. In order to enable GZIP-compression towards the client, the connector's compression-attribute is set to the value "on." The proxy (22) supports the HTTPS-protocol, which uses SSL31. For the usage of HTTPS, a second connector is created which opens the HTTPS-standard port 443. Therefore, the attribute "secure" in the connector is set "true" and the SSL Protocol-attribute is set to "TLS," which is just another name for SSL. Since this port also provides GZIP-compression, the compression-settings are the same as in the first connector.

Proxy-Application Installation

When the client requests an object from the proxy, the respective object is read from the portal. For example, when the client connects to http://proxy.com/anypage.jsp, the proxy has to call http://portal.com/anypage.jsp. Hence, two requirements can be derived from that. First, all requests targeting at the HTTP-server have to be directed to the proxy-application. Second, the proxy-application is accessible at the server's root (http://proxy.com/); otherwise the portal's file-structure cannot be mapped to the proxy's structure.

For example, if the client wants to request the object http://portal.com/anyfile.jsp it has to connect the proxy at http://proxy.com/proxyapp/anyfile.jsp, which is not desired because this would require further intervention to map the portal's references. To fulfill these requirements, two actions are taken. First, the proxy is installed as the root-application. Installing the proxy-application as the server's root-application can easily be done. The servlet application is simply deployed to Tomcat's "docbase" folder defined in the file server.xml.

Servlet Configuration

The configuration of servlets in Tomcat can either be done the central configuration-file web.xml or in each servlet's web.xml-file. In one embodiment, the central file may be manipulated. The relevant parts of this file are shown in the listing below:

```
<servlet>
<servlet-name>portalProxy</servlet-name>
<servlet-class>proxy.Interceptor</servlet-class>
</servlet>
<servlet-mapping>
<servlet-name>portalProxy</servlet-name>
<url-pattern>/*</url-pattern>
</servlet-mapping>
```

The servlet-element installs the proxy-application at the server and assigns it the name "portalProxy." The Interceptor-class may be declared as the application's root-class, which means that this class is accessed when an action towards the servlet is executed. The servlet-mapping element defines which server-requests are forwarded to the proxy application. Since the URL-pattern element's value is set to "/*," all requests targeting at the server are passed on to the portalProxy application.

In order to enable the proxy to handle multipart-requests, a multipart-filter of the before-mentioned prior art O'Reilly-servlet-package is installed. The concept of this multipart-approach is that a multipart-filter is installed, which intercepts all incoming messages. If multipart requests arrive at the server, further logic of the O'Reilly servlet package may be used to concatenate these requests to a single request which is then passed on to the proxy-application.

Hence, two steps are taken to enable multipart/form-data requests for the proxy. First, the O'Reilly-servlet-package may be installed. Installing the required package is quite simple. It has just to be copied to the common/lib directory in Tomcat's home directory.

Second, the Tomcat may be configured for the usage of the multipart filter. To ensure that all incoming requests are intercepted by the multipart-filter, some configuration of the Tomcat is performed. Analogous to the installation of the proxy-application the filter is configured in the central web.xml file. The relevant fragments are shown in the listing below:

```
<filter>
<filter-name>multipartFilter</filter-name>
<filter-class>com.oreilly.servlet.MultipartFilter</filter-class>
</filter>
<filter-mapping>
<filter-name>multipartFilter</filter-name>
<url-pattern>/*</url-pattern>
</filter-mapping>
```

The filter-element defines the filter and assigns the name "multipartFilter" to the filter. The filter mapping is analogous to the servlet-mapping mentioned above. Since the URL-pattern is set to "/*," all requests towards the server will be intercepted by this filter.

Modifications

Modifications to the before-described embodiment will now be described. Since the placeholder-portlet is the mediator between proxy and portal, it can be extended in a lot of respects to transport additional information from the portal to the proxy. Due to the used dynamic attribute pattern, any information entered in this portlet will be stored in the corresponding Session-object at the proxy-side. If an additional property is desired to be transmitted to the proxy it is added as a child-element to the placeholder-portlet's root element <localService>. The corresponding Service-Connector (FIGS. 5, 54) can then extract this property from the session by calling its getProperty method with the property's name. For example, if the group the portal user is assigned to shall be transferred to the proxy, an element "group" had to be added to the placeholder-portlet.

The ServiceConnector (FIGS. 5, 54) which is assigned to resolve the integration of the local resource can read the user's group by calling its getProperty-method in the following manner: String group=this.session.getProperty ("group").

The type of data which is transferred in this way can also be more complex, as long as it can be displayed as plain text. However, the corresponding ServiceConnector must be capable of handling this data. For example, if an XML-structure is stored in a child-element of the placeholder-markup, the session's getProperty method returns this structure as String object. The ServiceConnector (FIGS. 5, 54) is then responsible for extracting its desired information from this XML-string and may, therefore, need to use a XML-API like JDOM.

With regard to credential-security, a more complex encryption-algorithm may be optionally implemented to ensure a secure transfer of these credentials. This enhancement requires intervention at two points: the encryption of the credentials at the portal's side (in the placeholder-portlet) and the decryption at the proxy's side.

Encryption

When the placeholder-portlet's render phase is executed, the user's credentials are extracted from the credential vault. Then, they are passed to the class Encryptor which provides the static method encryption. This method retrieves a String object which is desired to be encrypted and a StringBuffer object (java.lang.StringBuffer), to which the encrypted text is written. The algorithm which is desired to be used for the credential-encryption is implemented in this method.

Decryption

The corresponding decryption-algorithm must be implemented at the proxy's side. When the information provided by the placeholder-portlet is stored to the session-object, the static method decrypt of the proxy's class Decryptor is called. Analogous to the encryption described above, this method is passed to the String-object to be decrypted and a StringBuffer-object to which the result is written. This method is replaced by a decryption-algorithm depending on the encryption algorithm used at the portal's side.

The present apparatus and methods can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for accessing stored data, comprising:
   integrating data stored and accessed on a local resource located at a client site into a placeholder portlet obtained from an extranet remote from said client site using a proxy computing device executing at the client site, wherein access to the data is performed by the proxy computing device based on a network request issued by a client device located at the client site, wherein the local resource, the client device, and the proxy computing device are in communication with but physically distinct from one another; and
   providing said portlet including said data stored and accessed on the local resource to a client browser executed on the client device in response to said network request.

2. The method of claim 1, wherein said proxy computing device is communicatively coupled to a network portal server located on the extranet remote from said client site; said method further comprising receiving the placeholder portlet from said network portal server.

3. The method of claim 2, further comprising, with said proxy computing device, evaluating said network request and forwarding said network request to said portal server to initiate receipt of said placeholder portlet.

4. The method of claim 3, wherein forwarding said request to said portal server comprises rewriting a Universal Resource Locator (URL) of said portal server.

5. The method of claim 2, wherein said placeholder portlet comprises portal content from said portal server to be displayed in said client browser along with said data stored on the local resource located at the client site.

6. The method of claim 2, wherein said placeholder portlet comprises one or more specified integration points at which said data stored on the local resource located at the client site is integrated into said placeholder portlet.

7. The method of claim 1, further comprising, with said proxy computing device, requesting and receiving said data stored on the local resource located at the client site from the separate local resource at said client site.

8. The method of claim 1, further comprising, with a Domain Name Service (DNS) server, redirecting said network request that is addressed to a corresponding portal server to said proxy computing device.

9. The method of claim 1, further comprising protecting said proxy computing device and the local resource storing said data at the client site behind a common firewall.

10. The method of claim 1, further comprising downloading a pre-programmed functionality of said proxy computing device to said client browser for being configurable at the client site.

11. A method for accessing data, comprising:
providing a placeholder portlet to a proxy computing device located at a client site, the client site being an intranet in which a client device is located;
wherein said placeholder portlet comprises content from an external service provider and is configured to integrate data stored on a local resource located at the client site with said content from the external service provider,
wherein access to the data stored on the local resource is performed by the proxy computing device based on a network request issued by the client device located at the client site, and
wherein the local resource, the client device, and the proxy computing device are in communication with but physically distinct from one another.

12. The method of claim 11, further comprising integrating said data stored on the local resource located at the client site with said placeholder portlet.

13. The method of claim 11, with said external portal server, receiving a said network request from said proxy computing device for accessing said data stored on the local resource located at the client site.

14. The method of claim 13, with said external portal server,
selecting a remote service from a predefined list of a number of remote services which fulfill said request; and
sending to said proxy computing device said place holder portlet comprising control information configured to control said proxy computing device to identify said selected remote service.

15. An electronic data processing system, comprising:
a proxy computing device located on a client site, the client site being an intranet in which a client device is located, the proxy computing device to intercept requests from the client device for access to data stored on a local resource located at the client site, the requests being addressed to an external portal server,
wherein the local resource, the client device, and the proxy computing device are in communication with but physically distinct from one another,
wherein said proxy computing device:
accesses said data stored on the local resource located at the client site,
integrates said locally stored data with content from said external portal server in a placeholder portlet, and
serves the placeholder portlet, including said locally stored data, to the client device.

16. The system of claim 15, further comprising a common firewall protecting said proxy computing device and a server storing said data stored on the local resource located at the client site.

17. The system of claim 15, wherein said placeholder portlet comprises one or more integration points at which said data stored on the local resource located at the client site is integrated into said placeholder portlet.

18. The system of claim 15, further comprising a Domain Name Service (DNS) server for redirecting a request that is addressed to said external portal server to said proxy computing device.

19. The system of claim 15, wherein said proxy computing device is configured to signal said external portal server in response to a said request for access to said data stored on the local resource located at the client site.

20. A computer program product for accessing data comprising:
a computer readable storage device comprising computer usable program code embodied therewith, the compute usable program code comprising:
computer usable program code executed on a proxy computing device to act as a proxy for a portal server by the proxy computing device located on a client site, the client site being an intranet in which a client device, the proxy computing device, and a local resource are located, and, with the proxy computing device, receive a network request from the client device for access to data stored on the local resource located at the client site,
computer usable program code to access said data stored on said local resource with the proxy computing device based on the network request issued by a client browser executed by the client device located at the client site, wherein the local resource, the client device, and the proxy computing device are in communication with but physically distinct from one another; and
computer usable program code to integrate said data stored on said local resource into a placeholder portlet that also comprises content from said portal sever.

* * * * *